US007029356B2

(12) United States Patent
Quigley et al.

(10) Patent No.: US 7,029,356 B2
(45) Date of Patent: *Apr. 18, 2006

(54) BUOYANCY CONTROL SYSTEMS FOR TUBES

(75) Inventors: Peter A. Quigley, Duxbury, MA (US); Stephen C. Nolet, Franklin, MA (US); Thomas W. Wideman, Milton, MA (US)

(73) Assignee: Fiberspar Corporation, New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/894,921

(22) Filed: Jul. 20, 2004

(65) Prior Publication Data

US 2005/0277347 A1 Dec. 15, 2005

Related U.S. Application Data

(63) Continuation of application No. 10/677,500, filed on Oct. 2, 2003, now Pat. No. 6,764,365, which is a continuation of application No. 10/134,660, filed on Apr. 29, 2002, now Pat. No. 6,663,453.

(60) Provisional application No. 60/287,268, filed on Apr. 27, 2001, provisional application No. 60/287,193, filed on Apr. 27, 2001, provisional application No. 60/337,848, filed on Nov. 5, 2001, provisional application No. 60/337,025, filed on Dec. 3, 2001.

(51) Int. Cl.
*B63B 51/02* (2006.01)

(52) U.S. Cl. ..................................... 441/133

(58) Field of Classification Search ............... 441/1, 441/133; 405/171; 114/264
See application file for complete search history.

(56) References Cited

U.S. PATENT DOCUMENTS

| 646,887 A | 4/1900 | Stowe et al. |
| 1,930,285 A | 10/1933 | Robinson ..................... 113/116 |
| 2,648,720 A | 8/1953 | Alexander .................... 174/34 |
| 2,690,769 A | 10/1954 | Brown ......................... 138/55 |
| 2,725,713 A | 12/1955 | Blanchard .................... 57/149 |
| 2,810,424 A | 10/1957 | Swartswelter et al. ....... 154/1.8 |
| 3,086,369 A | 4/1963 | Brown ......................... 61/72.3 |
| 3,116,760 A | 1/1964 | Matthews .................... 138/125 |
| 3,277,231 A | 10/1966 | Downey et al. .............. 174/47 |
| 3,334,663 A | 8/1967 | Peterson ..................... 138/132 |
| 3,379,220 A | 4/1968 | Kiuchi et al. ............... 138/125 |
| 3,477,474 A | 11/1969 | Mesler ........................ 138/133 |
| 3,507,412 A | 4/1970 | Carter ......................... 214/338 |
| 3,522,413 A | 8/1970 | Chrow ........................ 219/301 |

(Continued)

FOREIGN PATENT DOCUMENTS

DE 40 40 400 8/1992

(Continued)

OTHER PUBLICATIONS

GB Search Report dated Aug. 10, 2005.

(Continued)

*Primary Examiner*—Stephen Avila
(74) *Attorney, Agent, or Firm*—Foley Hoag LLP

(57) ABSTRACT

Buoyancy control methods for tubes are described. In one embodiment, a buoyancy control method can include a composite tube and a buoyancy control material for controlling the buoyancy of the composite tube. The composite tube can include an internal liner an external coaxial composite layer of fibers embedded in a matrix. One or more portions of the buoyancy control material can be attached to one or more portions of the composite tube to adjust the buoyancy of the one or more portions of the tube.

20 Claims, 13 Drawing Sheets

U.S. PATENT DOCUMENTS

| | | | |
|---|---|---|---|
| 3,554,284 A | 1/1971 | Nystrom | 166/250 |
| 3,579,402 A | 5/1971 | Goldsworthy et al. | 156/392 |
| 3,604,461 A | 9/1971 | Matthews | 138/137 |
| 3,606,402 A | 9/1971 | Medney | 285/305 |
| 3,692,601 A | 9/1972 | Goldsworthy et al. | 156/74 |
| 3,700,519 A | 10/1972 | Carter | 156/156 |
| 3,701,489 A | 10/1972 | Goldsworthy et al. | 242/7.21 |
| 3,728,187 A | 4/1973 | Martin | |
| 3,734,421 A | 5/1973 | Karlson et al. | 242/7.21 |
| 3,738,637 A | 6/1973 | Goldsworthy et al. | 269/61 |
| 3,740,285 A | 6/1973 | Goldsworthy et al. | 159/173 |
| 3,769,127 A | 10/1973 | Goldsworthy et al. | 156/172 |
| 3,773,090 A | 11/1973 | Ghersa et al. | 138/141 |
| 3,783,060 A | 1/1974 | Goldsworthy et al. | 156/69 |
| 3,828,112 A | 8/1974 | Johansen et al. | 174/47 |
| 3,856,052 A | 12/1974 | Feucht | 138/119 |
| 3,860,742 A | 1/1975 | Medney | 174/84 S |
| 3,901,281 A | 8/1975 | Morrisey | |
| 3,933,180 A | 1/1976 | Carter | 138/89 |
| 3,956,051 A | 5/1976 | Carter | 156/429 |
| 3,957,410 A | 5/1976 | Goldsworthy et al. | 425/183 |
| 3,960,629 A | 6/1976 | Goldsworthy | 156/180 |
| RE29,112 E | 1/1977 | Carter | 156/156 |
| 4,053,343 A | 10/1977 | Carter | 156/172 |
| 4,057,610 A | 11/1977 | Goettler et al. | 264/108 |
| 4,095,865 A | 6/1978 | Denison et al. | 339/16 R |
| 4,108,701 A | 8/1978 | Stanley | 156/160 |
| 4,114,393 A * | 9/1978 | Engle et al. | 114/264 |
| 4,125,423 A | 11/1978 | Goldsworthy | 156/428 |
| 4,133,972 A | 1/1979 | Andersson et al. | 174/47 |
| 4,137,949 A | 2/1979 | Linko, III et al. | 138/125 |
| 4,139,025 A | 2/1979 | Carlstrom | 138/153 |
| 4,190,088 A | 2/1980 | Lalikos et al. | 138/126 |
| 4,200,126 A | 4/1980 | Fish | 138/143 |
| 4,220,381 A | 9/1980 | van der Graaf | 339/16 C |
| 4,241,763 A | 12/1980 | Antal et al. | 138/127 |
| 4,248,062 A | 2/1981 | McLain et al. | 64/1 |
| 4,261,390 A | 4/1981 | Belofsky | 138/125 |
| 4,303,457 A | 12/1981 | Johansen et al. | 156/149 |
| 4,308,999 A | 1/1982 | Carter | 242/7.02 |
| 4,336,415 A | 6/1982 | Walling | 174/47 |
| 4,446,892 A | 5/1984 | Maxwell | 138/104 |
| 4,463,779 A | 8/1984 | Wink et al. | 138/125 |
| 4,515,737 A | 5/1985 | Karino et al. | 264/22 |
| 4,522,235 A | 6/1985 | Kluss et al. | 138/130 |
| 4,530,379 A | 7/1985 | Policelli | 138/109 |
| 4,556,340 A | 12/1985 | Morton | 405/195 |
| 4,578,675 A | 3/1986 | MacLeod | 340/855 |
| 4,606,378 A | 8/1986 | Meyer | 138/103 |
| 4,627,472 A | 12/1986 | Goettler et al. | 138/174 |
| 4,657,795 A | 4/1987 | Foret | 428/36 |
| 4,681,169 A | 7/1987 | Brookbank, III | 166/385 |
| 4,728,224 A | 3/1988 | Salama et al. | 405/195 |
| 4,789,007 A | 12/1988 | Cretel | 138/174 |
| 4,849,668 A | 7/1989 | Crawley et al. | 310/328 |
| 4,859,024 A | 8/1989 | Rahman | 350/96.23 |
| 4,992,787 A | 2/1991 | Helm | 340/854 |
| 5,097,870 A | 3/1992 | Williams | 138/115 |
| 5,170,011 A | 12/1992 | Martucci | 174/47 |
| 5,172,765 A | 12/1992 | Sas-Jaworsky et al. | 166/384 |
| 5,176,180 A | 1/1993 | Williams et al. | 138/172 |
| 5,182,779 A | 1/1993 | D'Agostino et al. | 385/13 |
| 5,184,682 A | 2/1993 | Delacour et al. | 166/385 |
| 5,188,872 A | 2/1993 | Quigley | 428/36.2 |
| 5,209,136 A | 5/1993 | Williams | 74/502.5 |
| 5,222,769 A | 6/1993 | Kaempen | 285/45 |
| 5,285,008 A | 2/1994 | Sas-Jaworsky et al. | 174/47 |
| 5,285,204 A | 2/1994 | Sas-Jaworsky | 340/854.9 |
| 5,330,807 A | 7/1994 | Williams | 428/34.5 |
| 5,334,801 A | 8/1994 | Mohn | 174/47 |
| 5,348,096 A | 9/1994 | Williams | 166/384 |
| 5,351,752 A | 10/1994 | Wood et al. | 166/68 |
| 5,394,488 A | 2/1995 | Fernald et al. | 385/13 |
| 5,426,297 A | 6/1995 | Dunphy et al. | 250/227.23 |
| 5,428,706 A | 6/1995 | Lequeux | 392/472 |
| 5,435,867 A | 7/1995 | Wolfe et al. | 156/171 |
| 5,443,099 A | 8/1995 | Chaussepied et al. | 138/109 |
| RE35,081 E | 11/1995 | Quigley | 428/36.2 |
| 5,469,916 A | 11/1995 | Sas-Jaworsky et al. | 166/64 |
| 5,499,661 A | 3/1996 | Odru et al. | 138/124 |
| 5,551,484 A | 9/1996 | Charboneau | 138/104 |
| 5,641,956 A | 6/1997 | Vengsarkar et al. | 250/227.14 |
| 5,683,204 A | 11/1997 | Lawther | |
| 5,730,188 A | 3/1998 | Kalman et al. | 138/135 |
| 5,755,266 A | 5/1998 | Aanonsen et al. | 138/174 |
| 5,797,702 A | 8/1998 | Drost et al. | 405/166 |
| 5,828,003 A | 10/1998 | Thomeer et al. | 174/69 |
| 5,908,049 A | 6/1999 | Williams et al. | 138/125 |
| 5,913,337 A | 6/1999 | Williams et al. | 138/125 |
| 5,921,285 A | 7/1999 | Quigley et al. | 138/125 |
| 5,933,945 A | 8/1999 | Thomeer et al. | 29/825 |
| 5,951,812 A | 9/1999 | Gilchrist, Jr. | 156/304.2 |
| 5,984,581 A | 11/1999 | McGill et al. | 405/172 |
| 6,004,639 A | 12/1999 | Quigley et al. | |
| 6,016,845 A | 1/2000 | Quigley et al. | 138/125 |
| 6,136,216 A | 10/2000 | Fidler et al. | |
| 6,148,866 A | 11/2000 | Quigley et al. | 138/125 |
| 6,209,587 B1 | 4/2001 | Hsich et al. | |
| 6,286,558 B1 | 9/2001 | Quigley et al. | 138/125 |
| 6,357,485 B1 | 3/2002 | Quigley et al. | 138/125 |
| 6,361,299 B1 | 3/2002 | Quigley et al. | 425/35.9 |
| 6,604,550 B1 | 8/2003 | Quigley et al. | |
| 6,663,453 B1 | 12/2003 | Quigley et al. | |
| 6,706,348 B1 | 3/2004 | Quigley et al. | |
| 6,764,365 B1 | 7/2004 | Quigley et al. | |
| 6,857,452 B1 | 2/2005 | Quigley et al. | |
| 2001/0185188 | 12/2002 | Quigley et al. | |

FOREIGN PATENT DOCUMENTS

| | | |
|---|---|---|
| DE | 4214383 C1 | 9/1993 |
| EP | 0024512 A1 | 3/1981 |
| EP | 0352148 A1 | 1/1990 |
| EP | 0505815 A2 | 9/1992 |
| EP | 0981992 A1 | 8/1999 |
| GB | 553110 | 8/1942 |
| GB | 2 193 006 | 1/1988 |
| GB | 2255994 A | 11/1992 |
| GB | 2270099 A | 3/1994 |
| WO | 87/04768 | 8/1987 |
| WO | WO 93/07073 | 4/1993 |
| WO | WO 93/19927 | 10/1993 |
| WO | WO 00/73695 | 12/2000 |

OTHER PUBLICATIONS

International Search Report Completed on Aug. 13, 2002.
Austigard E. and R. Tomter, "Composites Subsea: Cost Effective Products; an Industry Challenge," Subsea 94 International Conference, the 1994 Report on Subsea Engineering: The Continuing Challenges.
Connell Mike et al., "Coiled Tubing: Application for Today's Challenges," Petroleum Engineer International, pp 18-21 (Jul. 1999).
Feechan Mike et al., "Spoolable Composites Show Promise," The American Oil & Gas Reporter, pp. 44-50 (Sep. 1999).
Fowler Hampton, "Advanced Composite Tubing Usable," The American Oil & Gas Reporter, pp. 76-81 (Sep. 1997).
Fowler Hampton et al., "Development Update and Applications of an Advanced Composite Spoolable Tubing," Offshore Technology Conference held in Houston Texas from May 4-7, 1998, pp. 157-162.

Hahn H. Thomas and Williams G. Jerry, "Compression Failure Mechanisms in Unidirectional Composites," NASA Technical Memorandum pp. 1-42 (Aug. 1984).

Hansen et al., "Qualification and Verification of Spoolable High Pressure Composite Service Lines for the Asgard Field Development Project," paper presented at the 1997 Offshore Technology Conference held in Houston Texas from May 5-8, 1997, pp. 45-54.

Haug et al., "Dynamic Umbilical with Composite Tube (DUCT)," Paper presented at the 1998 Offshore Technology Conference held in Houston Texas from $4^{th}$ to $7^{th}$, 1998, pp. 699-712.

Lundberg et al., "Spin-off Technologies from Development of Continuous Composite Tubing Manufacturing Process," Paper presented at the 1998 Offshore Technology Conference held in Houston, Texas from May 4-7, 1998, pp. 149-155.

Marker et al., "Anaconda: Joint Development Project Leads to Digitally Controlled Composite Coiled Tubing Drilling System," Paper presented at the SPEI/COTA, Coiled Tubing Roundtable held in Houston, Texas from Apr. 5-6, 2000, pp. 1-9.

Measures R. M., "Smart Structures with Nerves of Glass," Prog. Aerospace Sci. 26(4):289-351 (1989).

Measures et al., "Fiber Optic Sensors for Smart Structures," Optics and Lasers Engineering 16: 127-152 (1992).

Poper Peter, "Braiding," International Encyclopedia of Composites, Published by VGH, Publishers, Inc., New York, NY 10010.

Quigley et al., "Development and Application of a Novel Coiled Tubing String for Concentric Workover Services," Paper presented at the 1997 Offshore Technology Conference held in Houston, Texas from May 5-8, 1997, pp. 189-202.

Sas-Jaworsky II and Bell Steve, "Innovative Applications Stimulate Coiled Tubing Development," World Oil, 217(6): 61 (Jun. 1996).

Sas-Jaworsky II and Mark Elliot Teel, "Coiled Tubing 1995 Update: Production Applications," World Oil, 216 (6): 97 (Jun. 1995).

Sas-Jaworsky, A. and J.G. Williams, "Advanced composites enhance coiled tubing capabilities," World Oil, pp. 57-69 (Apr. 1994).

Sas-Jaworsky, A. and J.G. Williams, "Development of a composite coiled tubing for oilfield services," Society of Petroleum Engineers, SPE 26536, pp. 1-11 (1993).

Sas-Jaworsky, A. and J.G. Williams, "Enabling capabilities and potential applications of composite coiled tubing," Proceedings of World Oil's $2^{nd}$ International Conference on Coiled Tubing Technology, pp. 2-9 (1994).

Sas-Jaworsky II Alex, "Developments Position CT for Future Prominence," The American Oil & Gas Reporter, pp. 87-92 (Mar. 1996).

Tore Wood Moe et al., "Spoolable, Composite Piping for Chemical and Water Injection and Hydraulic Valve Operation," Proceedings of the $11^{th}$ International Conference on Offshore Mechanics and Arctic Engineering-1992-, vol. III, Part A- Materials Engineering, pp. 199-207 (1992).

Shuart J. M. et al., "Compression Behavior of ≠45° - Dominated Laminates with a Circular Hole or Impact Damage," AIAA Journal 24(1): 115-122 (Jan. 1986).

Silverman A. Seth, "Spoolable Composite Pipe for Offshore Applications," Materials Selection & Design, pp. 48-50 (Jan. 1997).

Rispler K. et al., "Composite Coiled Tubing in Harsh Completion/Workover Environments," Paper presented at the SPE GAS Technology Symposium and Exhibition held in Calgary, Alberta, Canada, on Mar. 15-18, 1998, pp. 405-410.

Williams G. J. et al., "Composite Spoolable Pipe Development, Advancements, and Limitations," Paper presented at the 2000 Offshore Technology Conference held in Houston Texas from May, 1-4, 2000, pp. 1-16.

* cited by examiner

BUOYANCY CONTROL SYSTEMS FOR TUBES

CLAIM OF PRIORITY

This application is a Continuation of U.S. patent application Ser. No. 10/677,500, filed on Oct. 2, 2003, and now U.S. Pat. No. 6,764,365, which is a Continuation of U.S. patent application Ser. No. 10/134,660, filed on Apr. 29, 2002 and now U.S. Pat. No. 6,663,453, which claims priority to U.S. Provisional Application No. 60/287,268 filed Apr. 27, 2001, U.S. Provisional Application No. 60/287,193 filed Apr. 27, 2001, U.S. Provisional Application No. 60/337,848 filed Nov. 5, 2001, and U.S. Provisional Application No. 60/337,025 filed Dec. 3, 2001. All of the above-referenced patent applications are expressly incorporated by reference herein in their entireties.

BACKGROUND

Tubes used in sub-sea or underwater applications may have positive buoyancy, and thus may float unless weighted down. While in some situations positive buoyancy may be desirable, positive buoyancy can affect the performance of the tube and can also lead to an increase in collision-related accidents or damage from weather and wave action. Problems associated with positive buoyancy may be particularly acute with tubes that are manufactured from low-density structural materials or have large volumes of bore relative to the volume and density of the structural material.

The buoyancy of a tube generally depends upon the density of the tube, the size of the tube, and density of the fluids located inside and outside of the tubing. Buoyancy may also depend on the ratio of the inner diameter of the tubing to the cross-sectional area of the structural wall of the tubing. Tubes made from low-density materials, such as composite tubing, may have positive buoyancy when used to transport gasses, or fluids having a high concentration of gasses contained within the fluid.

In many situations in which a low-density material pipeline is installed underwater, or sub-sea, a weighting system has to be employed to weigh down the tubing forming the pipeline. Typically, discrete weights that may be made from concrete or metallic materials are employed to weigh down the pipeline to achieve overall negative buoyancy for the pipeline. Discrete weighting systems, however, have significant disadvantages. First, discrete weighting systems are generally time-consuming to install. Secondly, underwater personnel are often needed to physically attach a plurality of discrete weights to the pipeline. This can be expensive, and it unnecessarily exposes the personnel to the risks and dangers inherent in such underwater operations. Additionally, discrete weighting systems often do not lend themselves to shallow water installations. For example, when discrete weighting systems are used in shallow water installations, the inherently positive buoyant pipe can form catenaries between the discrete weights. This can result in sections of the pipeline rising above the sea-bed, or even reaching the surface, where the pipeline can be easily damaged by surface activities.

A further disadvantage of using discrete weighting systems is that these systems are static systems, such that that the weights cannot quickly and easily be moved from one location to another. Thus, in discrete weighting systems the location of the placed weights typically cannot be changed in real-time, or near real-time, in response to possible changes in the operational or environmental conditions.

Sub-sea or underwater applications of tubing include installations in which the tubing is installed on the seabed or trenched beneath the seabed. Such installations are generally static installations, as the installed pipeline is typically exposed to generally static loads only. In other applications, the tubing can be installed so that it traverses the water column from one depth to another, for example, from the seabed to surface. Such applications are generally considered dynamic installations, and are commonly found in the oil and gas offshore industry, as for example, pipe systems used in the production of oil or gas that traverse from a sub-sea well head to the surface as a riser, flow line, control line, or umbilical line. A piping system of low density tubing used in a dynamic installation may be subjected to dynamic loads caused by the changes in water depth, internal or external pressures, relative motion of the surface termination of the piping system compared to the sub-sea termination, currents, or other loadings. These shifting dynamic loads can adversely affect a piping system's performance capabilities. Typically, it is not possible to change the dynamic response or behavior of the piping system when discrete weighting systems are used.

For these reasons there is a need for buoyancy control systems that are easy to use and install, that may be static or dynamically controllable, and that may be installed without the use of underwater personnel.

SUMMARY

Disclosed herein are buoyancy control systems for tubes and methods for buoyancy control that facilitate the controlling of the buoyancy characteristics of a tube. In certain exemplary embodiments disclosed herein, the buoyancy control system may be an external system comprising a tube, tubes, or other structures having the desired buoyancy characteristics, e.g., positive or negative buoyancy, that may be externally coupled to a tube to control the buoyancy of the tube. In other exemplary embodiments, the buoyancy control system may be one or more integral buoyancy control layers having the desired buoyancy characteristics, e.g., positive or negative buoyancy, that may be incorporated into the tube to control the buoyancy of the tube. The buoyancy control systems disclosed herein may be deployed and utilized in conjunction with any type of tubing, including spoolable tubing, such as composite spoolable tubing and conventional spoolable steel tubing.

The buoyancy controls systems disclosed herein may provide increased installation flexibility. For example, in certain exemplary embodiments a buoyancy control material may introduced to the buoyancy control system either at a factory location, for example, during manufacturing of the tubing, immediately prior to or during the deployment of the buoyancy control system, or after the buoyancy control system has been deployed and installed underwater. Use of undersea personnel during installation may also be avoided.

In accordance with one exemplary embodiment, a buoyancy control system for controlling the buoyancy of a tube comprises a generally tubular length of buoyancy control material having a selected buoyancy characteristic. The length of buoyancy control material may be attached to a section of the length of the tube to adjust the buoyancy of the section of the tube.

The length of buoyancy control material may be an integral, coaxial layer of the tube or, alternatively, the length of buoyancy control material may be externally attached to tube. In embodiments in which the length of the buoyancy control material is externally attached, the buoyancy control material may have a longitudinal axis that is spaced-apart from a longitudinal axis of the tube.

The buoyancy control material may be positively buoyant, negatively buoyant, or neutrally buoyant. In the case of positively buoyant materials, the buoyancy control material may be a thermoplastic, a thermosett, or a thermoplastic foam material. Alternatively, the buoyancy control material may be a low-density polymer having a specific gravity of less than or equal to 1. In embodiments employing a negatively buoyant material, the buoyancy control material may have a specific gravity greater than or equal to 1.25. In certain embodiments, the buoyancy control material may have a specific gravity greater than or equal to 2.0. In certain exemplary embodiments, the buoyancy control material may be displaceable along the section of the tube.

BRIEF DESCRIPTION OF THE DRAWINGS

These and other features and advantages of the buoyancy control systems and methods disclosed herein will be more fully understood by reference to the following detailed description in conjunction with the attached drawings in which like reference numerals refer to like elements through the different views. The drawings illustrate principles of the systems and methods disclosed herein and, although not to scale, show relative dimensions, where.

DESCRIPTION OF EXEMPLARY EMBODIMENTS

Disclosed herein are exemplary embodiments of buoyancy control systems and methods that may be used to control the buoyancy characteristics of tubing. For example, the buoyancy control systems and methods disclosed herein may be used to reduce or increase the buoyancy of an inherently positively buoyant tube. Likewise, the buoyancy control systems and methods disclosed herein may be used to reduce or increase the buoyancy of an inherently negatively buoyant tube. Although the following exemplary embodiments are primarily described in connection with composite tubing, the buoyancy control systems disclosed herein may be used with tubing of any type, including metal and polymeric tubing.

Figure 1:
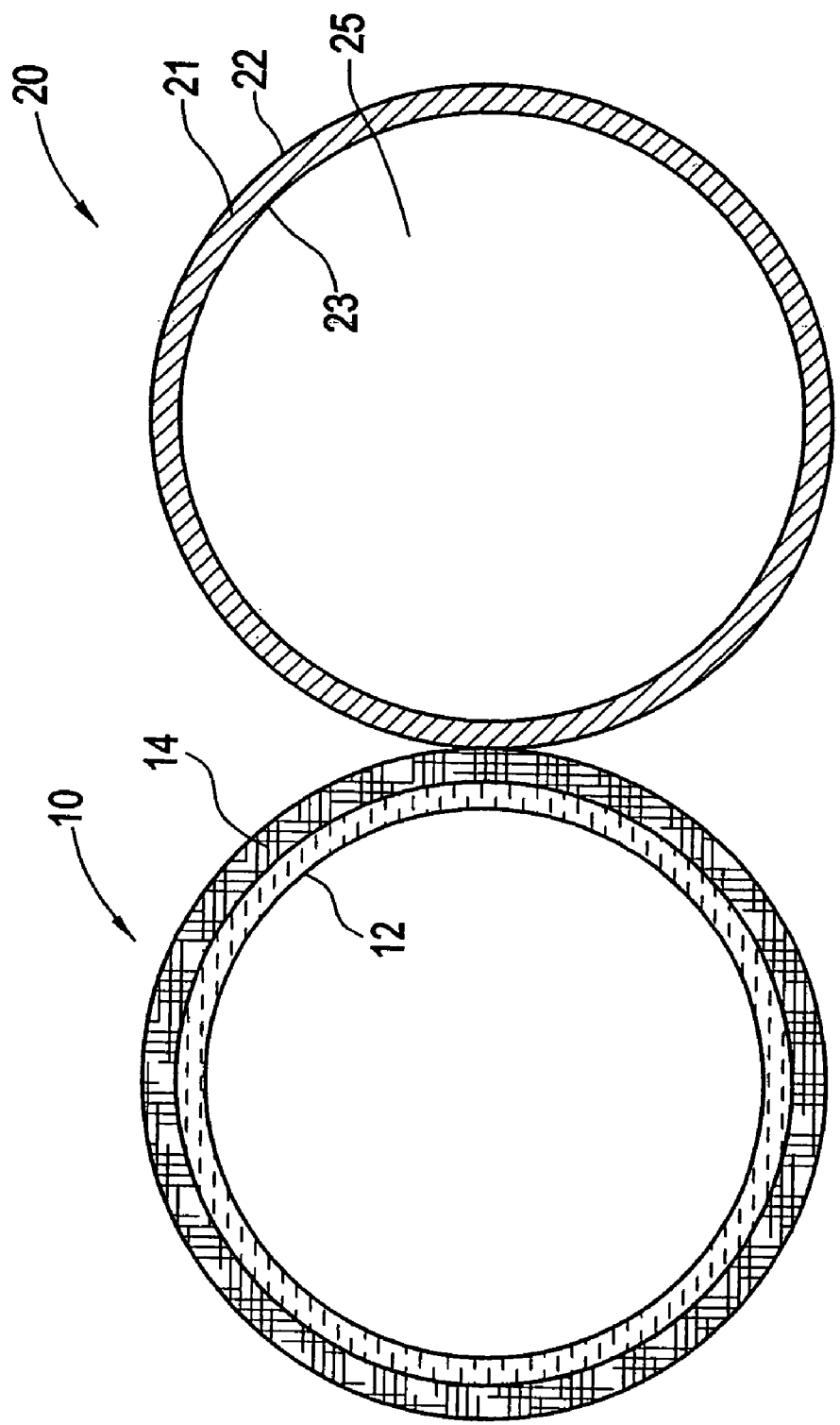
FIG. 1 is a cross-sectional view of an exemplary embodiment of a external buoyancy control system, illustrating the buoyancy control system coupled to a tube.
Figure 2:
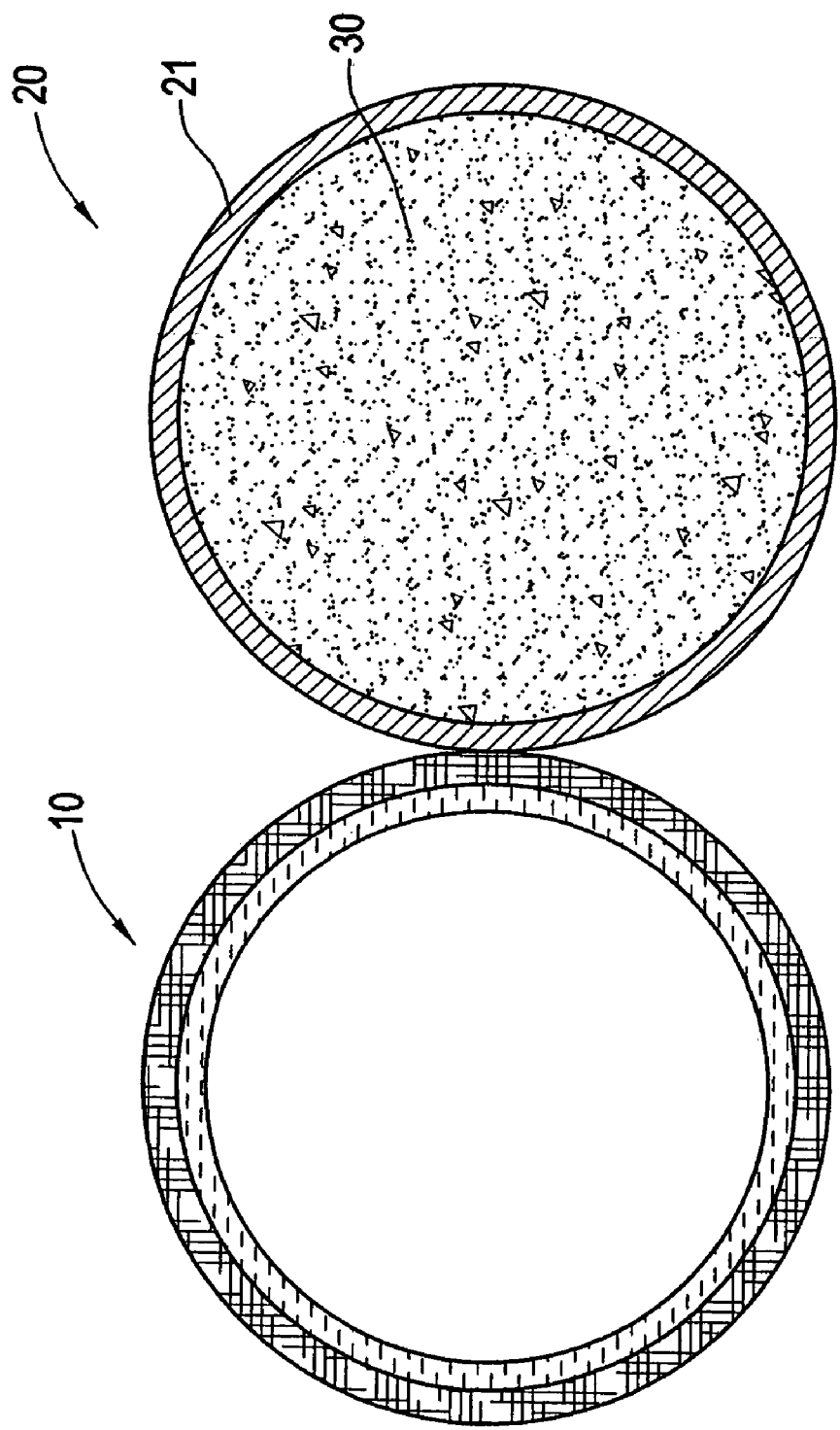
FIG. 2 is a cross-sectional view of the exemplary embodiment of the external buoyancy control system of FIG. 1, illustrating a buoyancy control material disposed within the buoyancy control system.

In an exemplary embodiment illustrated in FIGS. 1 and 2, an external buoyancy control system 20 comprises a tubular containment layer 21 that is externally coupled to a tube 10. In the illustrated exemplary embodiment, the tube 10 is a composite tube having an interior liner 12 and a composite layer 14. The tube 10 may be generally formed along a longitudinal axis and may have a variety of cross-sectional shapes, including circular, oval, rectangle, square, polygonal, and the like. The illustrated tube 10 has a circular cross-section. The tube 10 can generally be constructed in manner analogous to one or more of the composite tubes described in commonly-owned U.S. Pat. No. 6,016,845, U.S. Pat. No. 5,921,285, U.S. Pat. No. 6,004,639, and U.S. Pat. No. 6,148,866 and commonly-owned U.S. patent application Ser. No. 10/134,660, filed on Apr. 29, 2002, and entitled Improved Composite Tubing. Each of the aforementioned patents and patent applications is incorporated herein by reference in their entireties.

As described below, the containment layer 21 may be filled with a buoyancy control material 30 to adjust the buoyancy of the tube 10 to a desired positive, negative, or neutral buoyancy. Depending on the buoyancy control material selected, the position of the buoyancy control material 30 within the buoyancy control system 20 may be dynamically controlled along the length of the containment layer 21 so as to provide the desired buoyancy properties (e.g., negative, neutral or positive buoyancy) for a selected operational environment or, alternatively, to adjust the buoyancy of the tube 10 in response to a change in environmental conditions.

In the present exemplary embodiment, the containment layer 21 is a continuous tube having a generally circular cross-section. In other exemplary embodiments, the containment layer 21 may have alternative cross-sections, and may be non-continuous or constructed in interconnected discrete lengths. The containment layer 21 may be fabricated from materials that are resistant to water, salt water, marine organisms, including, for example, materials that are generally corrosion resistant. The containment layer 21 may also be collapsible and expandable to facilitate deployment. The containment layer 21 may be spoolable on a reel to facilitate transport and to facilitate use of the buoyancy control system 20 with spoolable tubing. In the case of spoolable buoyancy control systems, the containment layer 21 may be designed to have sufficient stiffness and strength to be able to be spooled and remain in an open bore configuration to a maximum spooling strain of at least 1% spooling strain.

The containment layer 21 of the buoyancy control system 20 may be designed to have sufficient wall thickness, strength and stiffness, to accommodate the pumping pressures that may be required to pump or otherwise displace a selected buoyancy control material 30 into the annulus 25 of the containment layer 21 in lengths of at least 100 ft. long.

Suitable materials for use in the fabrication of the containment layer 21 may include thermoplastics, e.g., PE, PET, PP, Nylon, urethanes, and elastomers; and thermosetts, e.g., rubbers, epoxy, phenolic, vinylester, polyester, and urethanes. Additionally, the containment layer 21 may be comprised of composite materials such as: fiber reinforced thermosetts, fiber reinforced thermoplastics, metallic and non-metallic hybrids, and fiber reinforced rubbers and other polymers. In the case of composite materials, the containment layer 21 may be constructed in a manner analogous to the composite tubing described in the patents and patent applications identified above.

Persons skilled in the art will appreciate that the containment layer 21 need not be a single layer, but may instead be comprised of multiple layers including, for example, combinations of thermoplastics, thermosetts, and composite layers. In other exemplary embodiments, the containment layer 21 may be a collapsible hose, and in this case, the containment layer 21 need not maintain an open bore configuration on the spool, but instead may flatten to facilitate transport and storage.

To maximize the spooling efficiency buoyancy control systems 20 employing a continuous spoolable containment layer 21, it may be desirable for the outer diameter 22 of the containment layer 21 to be equal to or approximate the outer diameter of tube 10, as illustrated in FIGS. 1 and 2. However, in other embodiments, the outer diameter 22 of the containment layer 21 need not be the same as the outer diameter of the tube 10.

As illustrated in FIG. 2, the buoyancy control material 30 may be contained within the interior space defined by the containment layer 21 (i.e., the annulus 25). The buoyancy control material 30 of the buoyancy control system 20 may be introduced into the containment layer 21 either at a factory location, e.g., during manufacturing, immediately prior to or during the deployment of the continuous buoyancy control system 20, or after the buoyancy control system 20 has been deployed and installed underwater or underground. In certain embodiments, the buoyancy control material 30 may be capable of being pumped in lengths of at least 100 ft. with relatively low pressures, for example, less than 500 p.s.i. pumping pressure.

The buoyancy control material 30 selected to provide a desired buoyancy for the buoyancy control system 20 and the tube 10 preferably has a density which is sufficient to provide the tube 10 and the buoyancy control system 20 a desired overall buoyancy. In applications in which the buoyancy control system 20 is to be used to weigh down an otherwise positively buoyant tube 10, a buoyancy control material 30 having a specific gravity of greater than 1.25, preferably 2.0 or greater, may be sufficient to achieve the desired overall negative buoyancy to the tube 10 and the buoyancy control system 20. Suitable buoyancy control materials 30 may include, but are not limited to: weighted slurries such as drilling mud, sand loaded water, and barite loaded water; gels or settable fluids such as cement and filled resins; and, particulates such as sand, metals, ceramics or fluids with dissolved buoyancy control materials. Suitable buoyancy control materials 30 may also include homogeneous fluids with a density greater than 1.25 g/cm$^3$. Suitable buoyancy control material may also include liquids, oils, halogenated hydrocarbons or oils, monomers, oligomers, or liquid polymers. These buoyancy control materials may also contain halogen or main group elements from Groups 3A–7A. Examples include tribromopropane (density=2.967 g/cm$^3$), dibromobutane (density=1.756 g/cm$^3$) and brominated vegetable oils. These materials may be settable or gellable, such as brominated epoxy resins or urethanes resins, including polyols with isocyanates. Suitable buoyancy control materials 30 may also include liquids or fluids in which a buoyancy control material is partially or incompletely dissolved. Suitable liquids or fluids may include water, hydrocarbons, inorganic or organic solvents, oils, crudes, monomers, oligomers, or liquid polymers. These materials may be settable or curable. Suitable buoyancy control materials in these liquids or fluids may include salts based on Group 1A and 2A cations with halogen anions, such as calcium chloride, calcium bromide, zinc bromide. The fluids may contain salts based on Group 1A and 2A cations with organic or inorganic polyatomic anions. The fluids may contain salts, complexes, or compounds of transition metals with either inorganic or organic ligands, counter-ions or adducts. The fluids may contain metal oxides or main group oxides.

Suitable buoyancy control materials 30 may also include liquids, fluids, slurries, dispersions, suspensions, where the buoyancy control material 30 is completely or incompletely dispersed or suspended. Suitable materials include water, inorganic or organic solvents, oils, crudes, or hydrocarbons in which organic, organic-inorganic or inorganic salts, minerals, ceramics, metal oxides or main group oxides, clays, sand, cement, metals, high density or filled polymers or resins, are completely or incompletely dispersed or suspended. In addition, gels, surfactants, emulsifiers, and stabilizers may be used to control the degree of dispersion or suspension. Curing agents, hardeners, or gellation agents may be used to set the materials during or after installation to set or gel the material. Examples include drilling mud, ballast fluids, sand loaded water, barite loaded water, cement, or concrete.

In the case of a positively buoyant buoyancy control material, the buoyancy control material 30 may be syntactic foams, foamed thermoset or thermoplastic materials such as epoxy, urethane, phenolic, vinylester, polypropylene, polyethylene, polyvinylchlorides, nylons, thermoplastic or thermosett materials filled with particles (such as glass, plastic, micro-spheres, ceramics), filled rubber or other elastic materials, or composites of these materials. In certain exemplary embodiments, a positively buoyant buoyancy control material is a low-density polymer having a specific gravity of less than or equal to 1.

The buoyancy control material 30 may become hardened over time, i.e., a set-up time, within the containment layer 21 or, alternatively, may remain pliable for an indefinite period of time, e.g., a non-binding slurry. The buoyancy control material 30 may also be a combination of the material types described above. Such combination of buoyancy control materials 30 may be composed of one or more layers of material, or alternatively as a blend of two or more homogeneous or heterogeneous materials. For example, the buoyancy control material 30 can consist of a HDPE or polypropylene outer layer which may be co-extruded, or extruded in a separate operation, over a barite loaded polypropylene layer.

In those embodiments where a selected buoyancy control material 30 may hardened or set over time, the buoyancy control material 30 preferably remains sufficiently flowable so that it can be appropriately pumped throughout the buoyancy control system 20 as needed. Furthermore, if the buoyancy control material 30 is to be pumped into a spoolable continuous buoyancy control system 20, either before or after the spoolable continuous buoyancy control system 20 has been spooled onto a reel or other suitable fixture, then the buoyancy control material 30 preferably remains sufficiently pliable until the continuous buoyancy control system 20 is deployed by unspooling. Otherwise, the continuous buoyancy control system 20 may become rigid and thus may not be deployable.

Alternatively, in some situations it may be desirable to use a buoyancy control material 30 which will not set-up or harden, or has a very long set-up time. This is particularly true for continuous buoyancy control systems 20 used in dynamic installation environments. First, it may be desirable to have a continuous buoyancy control system 20 that is flowable so that the overall buoyancy control system 20 can respond to the operational and environmental forces that are be acting upon it. Secondly, if dynamic control of the buoyancy control system 20 is sought, the buoyancy control material 30 preferably remain sufficiently flowable within the buoyancy control system 20 so that the displacement of the buoyancy control material 30 along the length of the continuous buoyancy control system 20 can be varied, by pumping, for example, as the selected operational conditions or changing environmental conditions dictate.

An advantage of utilizing a flowable buoyancy control material 30 is that such continuous buoyancy control systems 20 will not become rigid and thus the buoyancy control system may be retrievable, for example, respoolable, and reused for other installations.

In certain exemplary embodiments, the containment layer 21 may not be necessary depending on the buoyancy control materials selected. For example, in the case of a buoyancy control material that is hardened or in a solid form, the buoyancy control material may be externally coupled to the tube 10, independent and without the need for a containment layer 21. A hardened or solid buoyancy control material may be tubular in shape and continuous to facilitate spooling.

Figure 3:
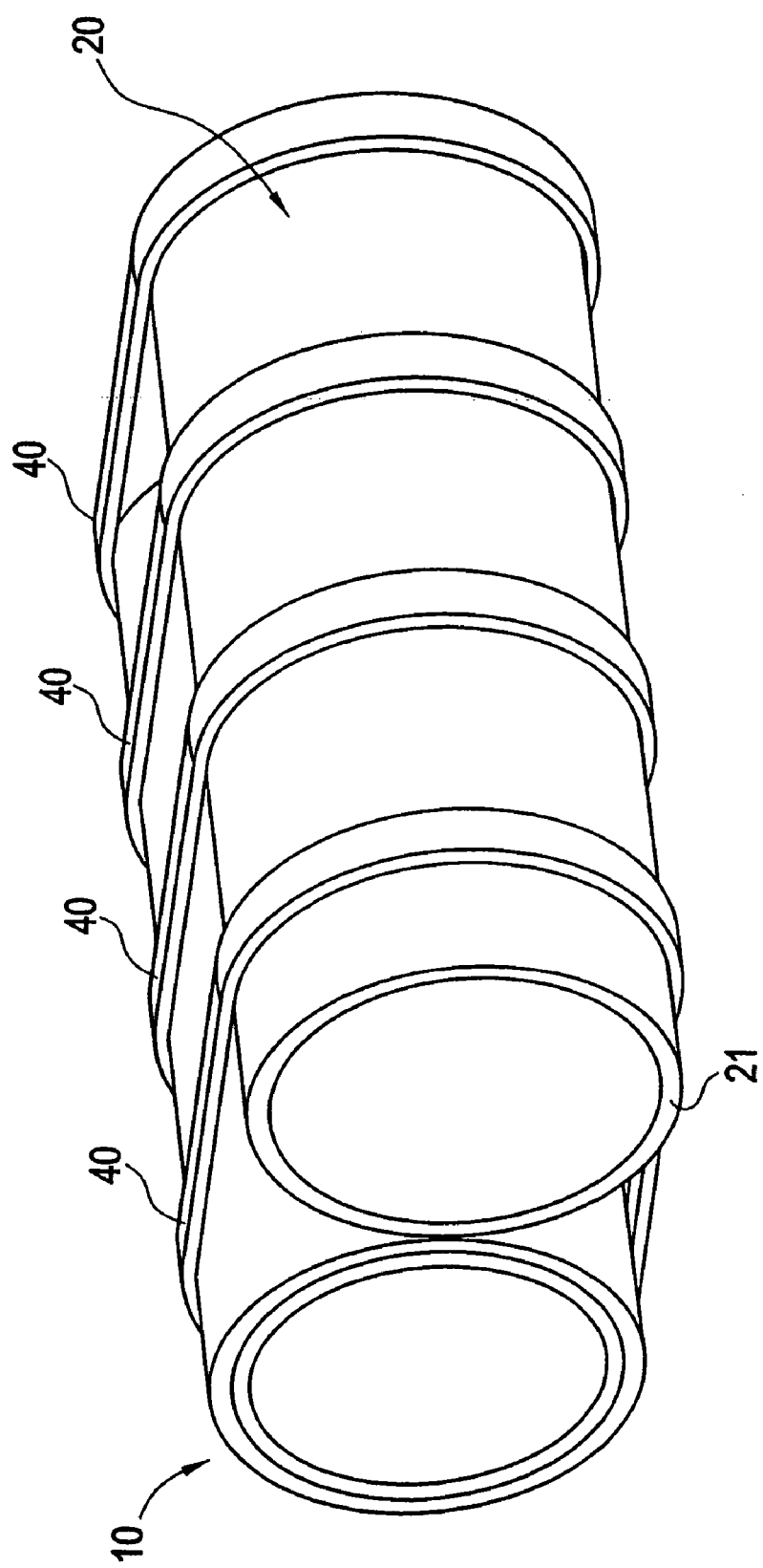
FIG. 3 is a perspective view of an exemplary embodiment of an external buoyancy control system, illustrating the buoyancy control system discretely affixed to a tube.
Figure 4:
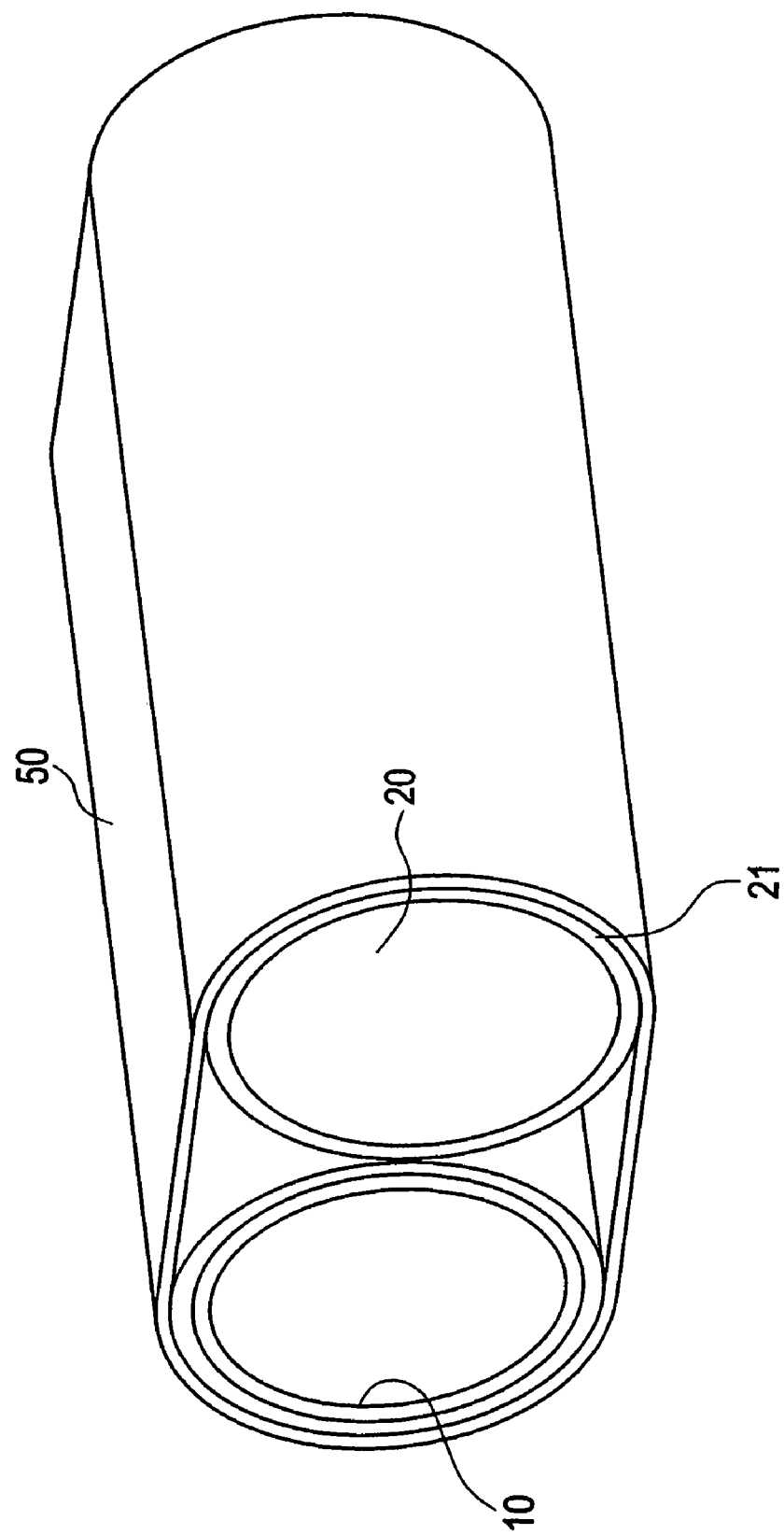
FIG. 4 is a perspective view of an exemplary embodiment of an external buoyancy control system, illustrating the buoyancy control system continuously affixed to a tube.
Figure 5:
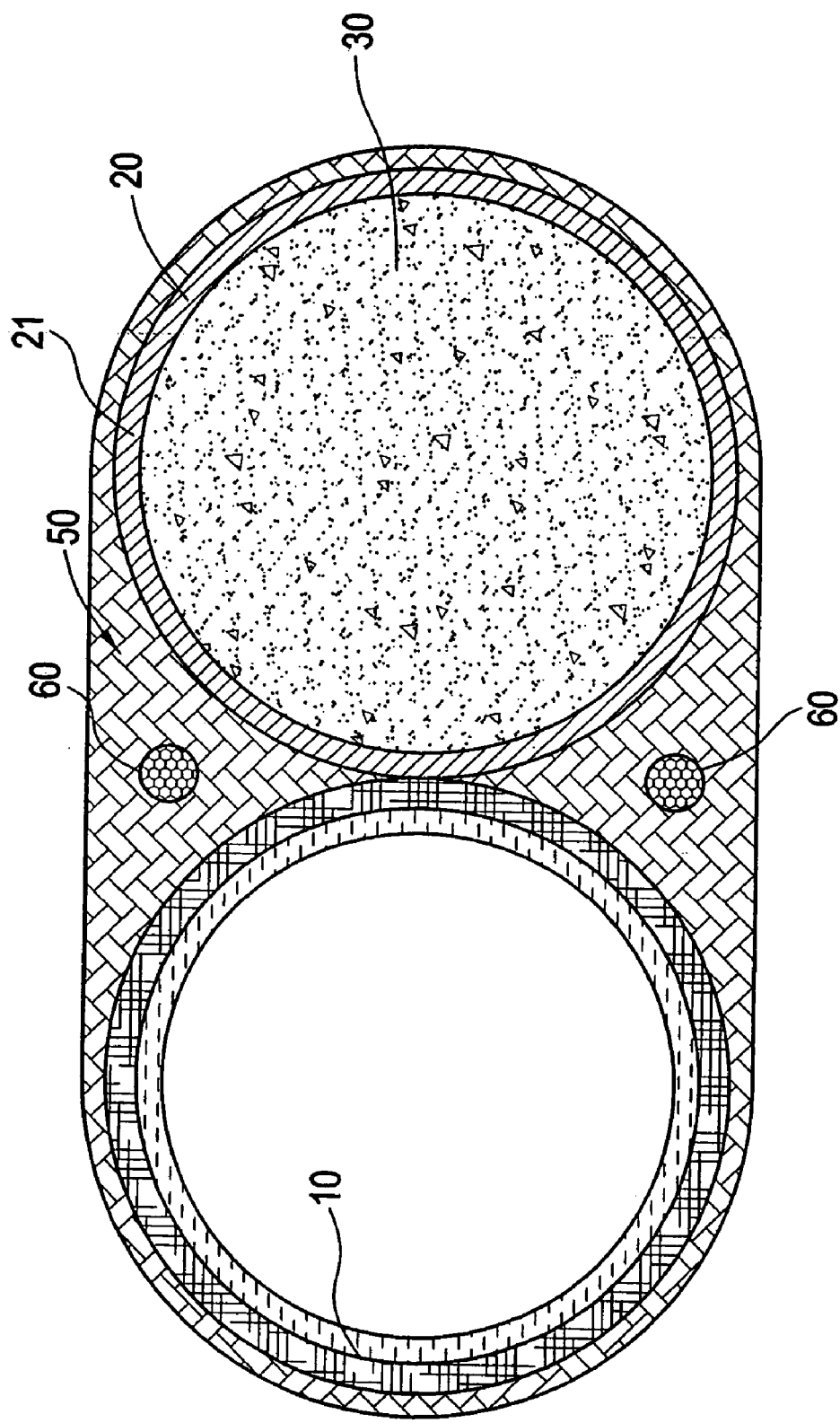
FIG. 5 is a cross-sectional view of an exemplary embodiment of an encapsulated external buoyancy control system and tube, illustrating energy conductors embedded the encapsulated external buoyancy control system and tube.
Figure 6:
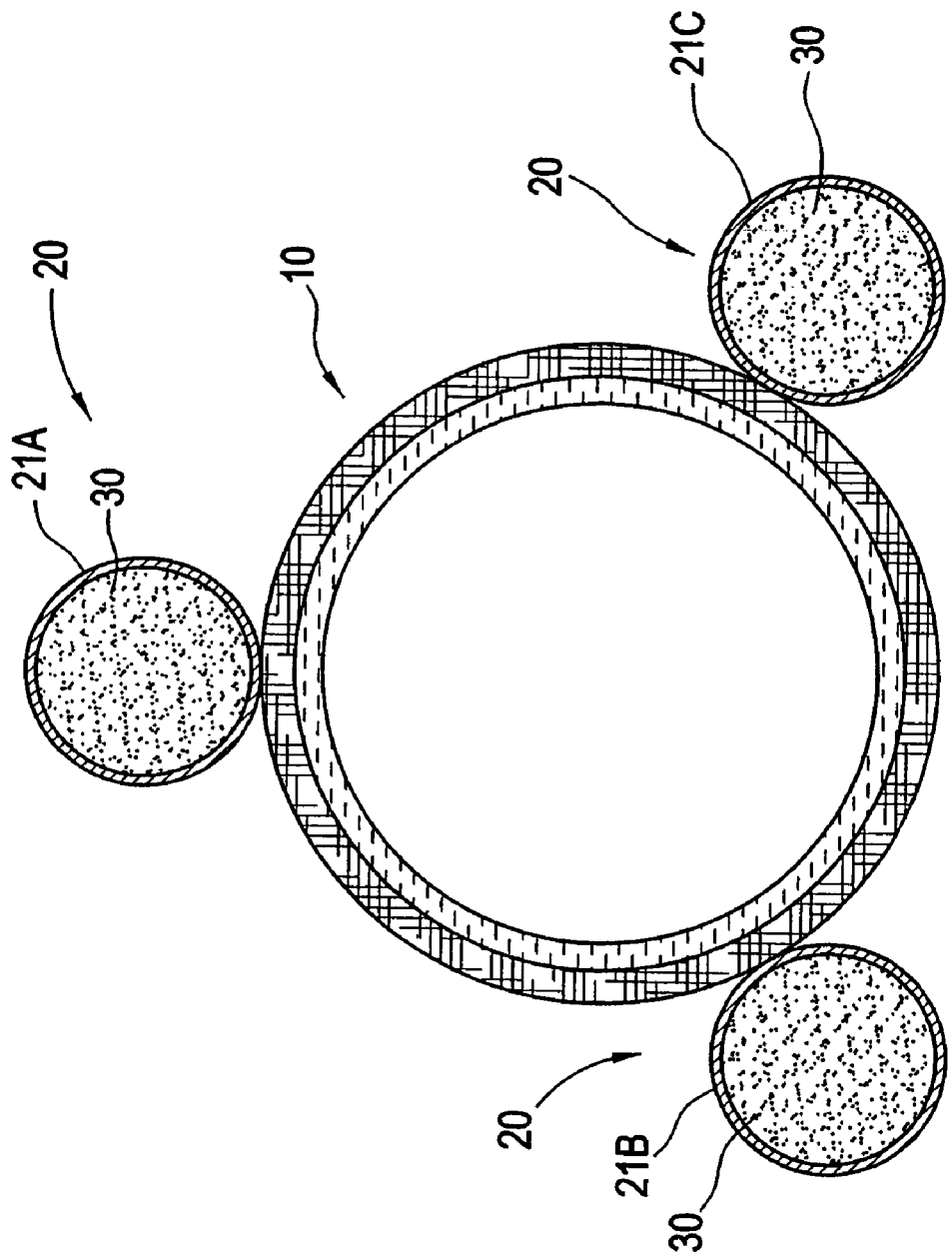
FIG. 6 is a cross-sectional view of an exemplary embodiment of a external buoyancy control system having multiple tubular components, illustrating the tubular components arranged separately about the circumference of a tube.
Figure 7:
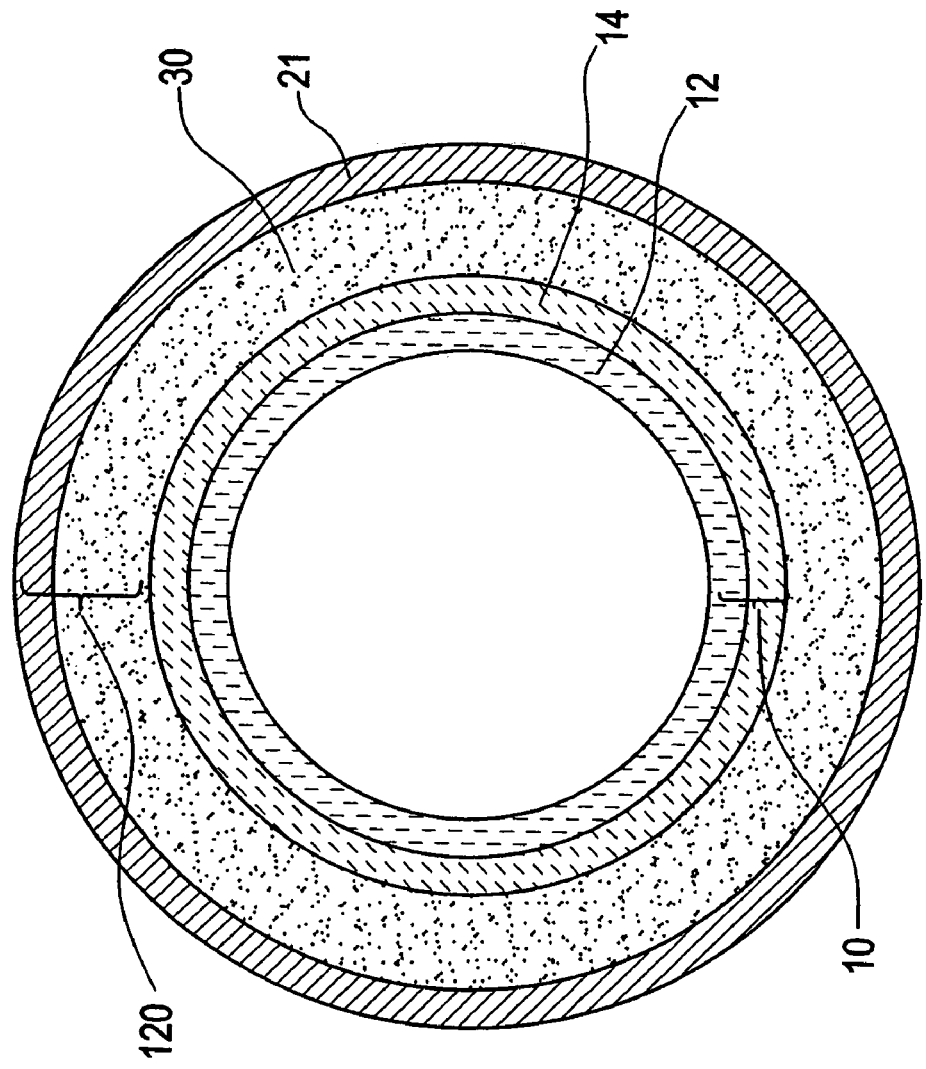
FIG. 7 illustrates an exemplary embodiment of an integral buoyancy control system comprising a buoyancy control layer integral to a tube.
Figure 8:
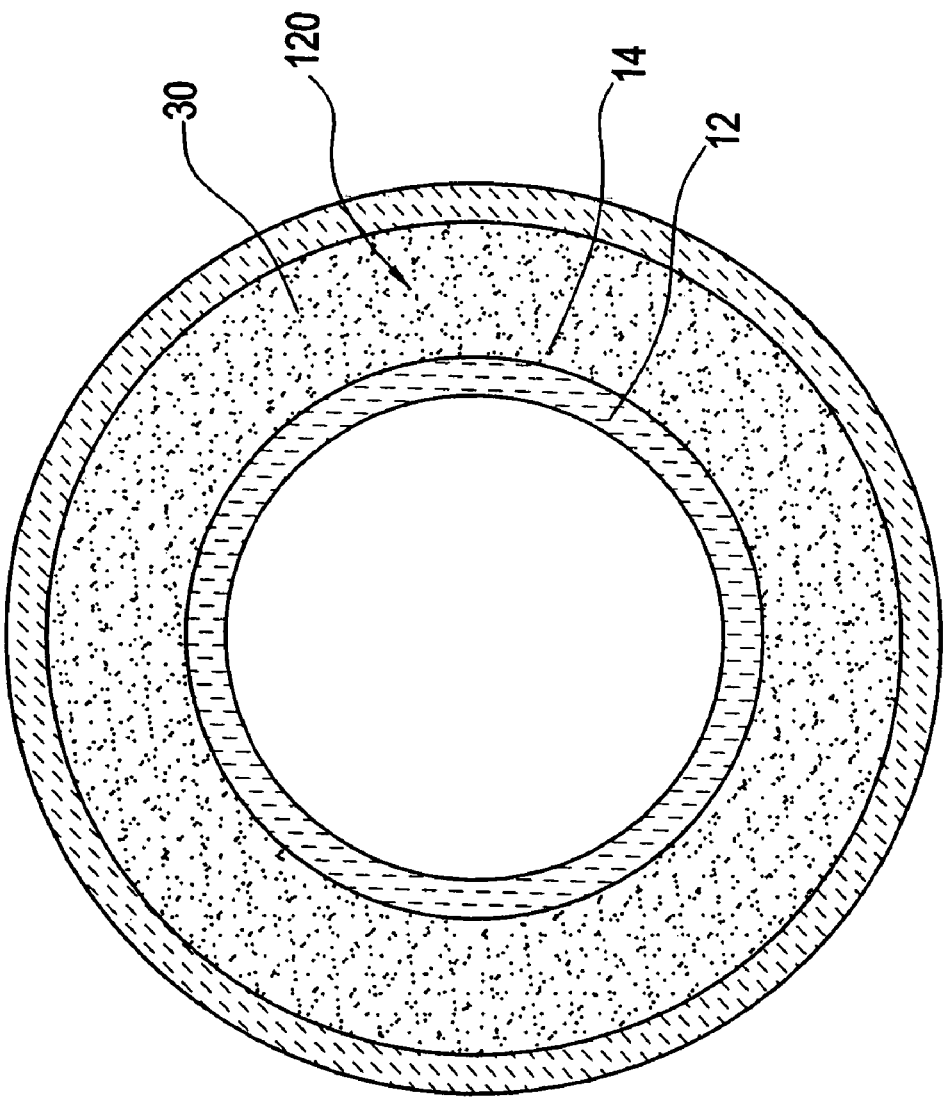
FIG. 8 illustrates another exemplary embodiment of an integral buoyancy control system comprising a buoyancy control layer integral to a composite tube, illustrating the buoyancy control layer interposed between the interior liner and the composite layer of the composite tube.
Figure 9:
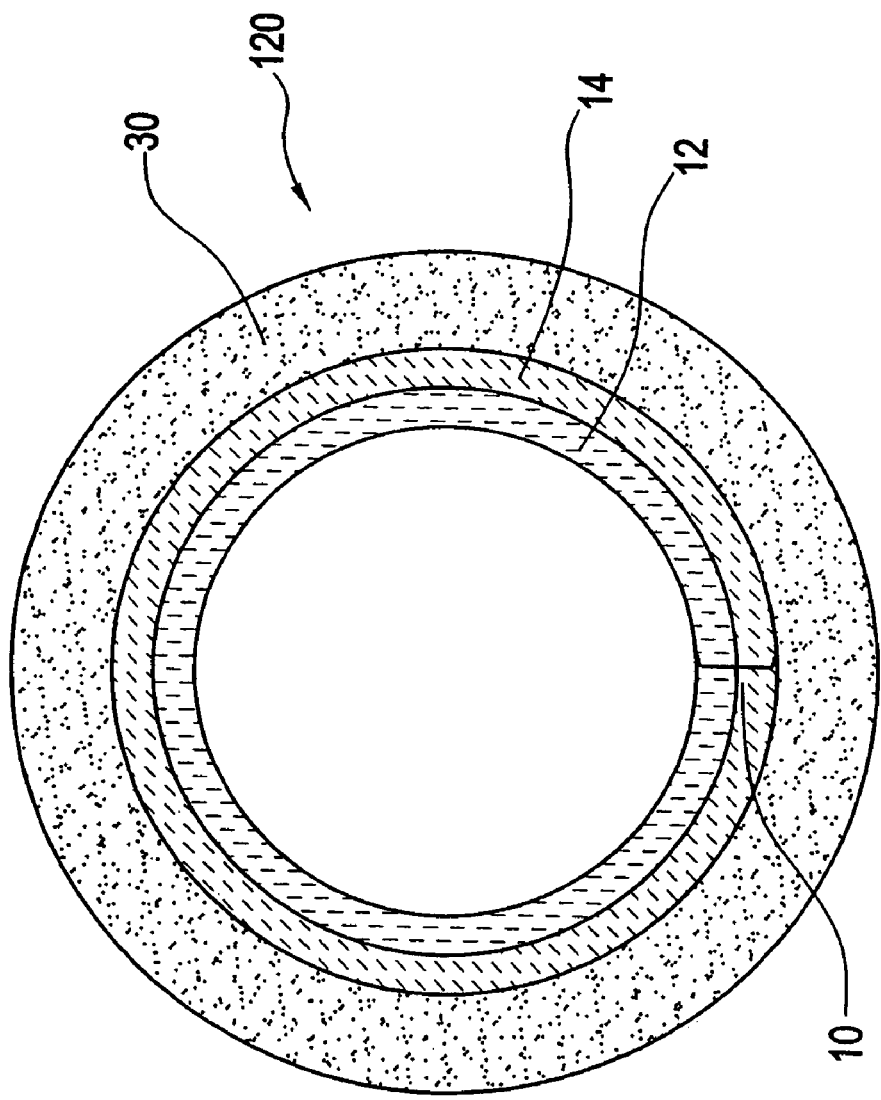
FIG. 9 illustrates a further exemplary embodiment of an integral buoyancy control system comprising a buoyancy control layer integral to a composite tube, illustrating the buoyancy control layer exterior to a composite layer of the composite tube.

The buoyancy control systems disclosed herein may be externally coupled to the tube 10, as illustrated in FIGS. 1–6, or may be integral to the tube 10, as illustrated in FIGS. 7–9. In FIGS. 1 and 2, for example, the containment layer 21 may be externally coupled to the tube by chemical or mechanical bonding, by an adhesive, or by other coupling mechanism. Further mechanisms for coupling the containment layer 21 to the tube 10 are illustrated in FIGS. 3–5, discussed below. The containment layer 21 may be coupled at discrete portions of tube 10 or continuously along the length of the tube 10.

FIG. 3 illustrates an embodiment wherein the containment layer 21 of the continuous buoyancy control system 20 is discretely attached to the tube 10 through the use of a plurality of straps 40. In addition to the illustrated straps 40, other fasteners may also be employed, including, but not limited to, banding, taping, clamping, discrete bonding, and other mechanical and/or chemical attachment mechanisms known in the art. The containment layer 21 of the continuous buoyancy control system 20 may also have a corrugated outer surface to inhibit the discrete fastener 40, such as the bands or straps, from dislodging during the installation process. For example, the containment layer 21 may have a corrugated outer surface having a plurality of alternating peaks and valleys that are oriented circumferentially, for example, at approximately 90° relative to the longitudinal axis of the containment layer 21. The straps 40 may be positioned within the valleys of the corrugated surface to inhibit dislodging of the straps 40.

Referring to FIG. 4, the containment layer 21 of the buoyancy control system 20 may also be continuously affixed to the tube 10 by an outer jacket 50 that encapsulates the tube 10 and the containment layer 21 of the buoyancy control system 20. In the illustrated exemplary embodiment, the outer jacket 50 is a continuous tube having a generally oval cross-section that is sized and shaped to accommodate the tube 10 and the buoyancy control system 20. One skilled in the art will appreciate that other cross sections may be employed and that the outer jacket 50 may be constructed in discrete interconnected segments. The outer jacket 50 may extend along the entire length of the tube 10 or the buoyancy system 20 or may be disposed along discrete segments of the tube 10 and the buoyancy control system 20. The outer jacket 50 may also be spoolable.

The outer jacket 50 may be a separately constructed tubular or other structure that is attached to the tube 10 and the system 20 during installation of the tube 10 and the system 20. Alternatively, the outer jacket 50 may be attached during manufacturing of the tube 10 and/or the system 20. The outer jacket 50 may be formed by continuous taping, discrete or continuous bonding, winding, extrusion, coating processes, and other known encapsulation techniques, including processes used to manufacture fiber-reinforced composites. The outer jacket 50 may be constructed from polymers, metals, composite materials, and materials generally used in the manufacture of polymer, metal, and composite tubing. Exemplary materials include thermoplastics, thermosett materials, fiber-reinforced polymers, PE, PET, urethanes, elastomers, nylon, polypropylene, and fiberglass.

Referring to FIG. 5, a further exemplary embodiment of the outer jacket 50 is illustrated. In the exemplary embodiment, the material of the outer jacket 50 fills the space between the tube 10 and the containment layer 21 of the buoyancy control system 20. The outer jacket 50, or any other components of the buoyancy control system 20, including the containment layer 21, may include one or more energy conductors 60 embedded in the material forming the outer jacket 50 that is used to affix the buoyancy control system 20 to the tube 10. In the present exemplary embodiment, two parallel, oppositely spaced energy conductors 60 are provided. The energy conductors 60 may be axially, circumferentially, or helically oriented, or a combination of these, relative to the orientation of the longitudinal axis of the continuous buoyancy control system 20.

The energy conductors 60 may be insulated or uninsulated metal wires, hydraulic or pneumatic lines, tracer lines or light guiding mediums, such as optical fibers, or any other medium for transmitting energy, including one or more of the energy conductors used in the composite tubing described in above-referenced patents and patents applications. In the case of multiple energy conductors, the energy conductors may be the same or different types of energy conductors. Depending on the type of energy conductor selected, the energy conductors 60 may be used to inject chemicals into the tube 10 or the system 20 at a particular location, to heat or cool the tube 10, to transmit data or power, and may include metallic or magnetic materials, which can be used to locate buried sub-sea pipelines with the use of metal detectors, magnetic detectors, or other detecting equipment. In the case of energy conductors that are hydraulic and pneumatic control lines or used for chemical injection, the energy conductors may be formed of plastics, composites, and metallic materials, for example. An energy conductor 60 that is used for heating may be a resistive and conductive material, for example, metal or ceramic wires; tubing for transporting a heating or cooling fluid, or other appropriate heating elements. An energy conductor 60 that is used for data or power transmission may be a metal wire, an optical fiber or alternative light guiding medium, or any other material or medium useful for transmitting data or power. An energy conductor 60 that is used as a tracer line may be made of a metallic material.

Although energy conductors 60 are described in connection with the embodiment of FIG. 5 only, one skilled in the art will appreciate that one or more energy conductors may be used with any of the exemplary embodiments of the outer jacket 50 or other components of the buoyancy control systems disclosed herein.

The outer jacket 50, or any other components of the buoyancy control system 20, including the containment layer 21, may include sensors used for flow assurance monitoring, leak detection, temperature and pressure measurements, or other data monitoring and communication purposes. The sensors may be connected for signal communication by way of one or more of the energy conductors 60. Alternatively, the sensors may be integral to the energy conductors 60, as in the case of gratings formed on an optical fiber. Suitable sensors and sensors arrangements are described in the above-referenced U.S. patent and patent applications.

In dynamic installation applications, the energy conductors 60 may include discrete or continuous sensors that can be used to optimize the dynamics of the sub-sea pipe system depending upon the operating conditions or changing environmental conditions. Numerous examples of these type of integrated energy conductors and sensors and known to those skilled in the art. In certain exemplary embodiments, pumps or baffles may be placed at discrete locations along the containment layer 21 to accomplish the desired transfer of the buoyancy control material 30. Examples of sensors 60 for dynamic installation applications include but are not limited to strain gauges, gyroscopes, accelerometers, and pressure and temperature transducers. Sensors 60 may be based on optical fiber technology, such as a fiber optic Bragg gratings, or be discrete optical, digital, or analog sensors connected in series or in parallel.

FIG. 6 illustrates an alternative embodiment of a buoyancy control system 20. In the illustrated embodiment, the buoyancy control system 20 includes a plurality of discrete tubular containment layers 21A–C, each filled with buoyancy control material 30. The containment layers 21A–C are positioned about the circumference of the tube 10. The containment layers 21A–C may be affixed to the tube 10 through the use of an outer jacket 50, by discrete fastener 40, or by any of the other attachment mechanism described above. The containment layers 21A–C may be banded, encapsulated, spirally wrapped, or otherwise attached to the tube 10. The separate containment layer 21A–C may be symmetrically arranged about the circumference of the tube 10, or alternatively, may be spaced asymmetrically about the circumference of the tube. In certain embodiments, the containment layers 21A–C may be configured to permit spooling of the tube and the system 20. Although three containment layers 21A–C are shown in FIG. 6, any number of containment layers 21, including a single containment layer, may be employed at various locations about the circumference of the tube 10.

In certain exemplary embodiments, it may be desirable to position the containment layers 21A–C about the circumference of the tube 10 to protect the tube 10 from collision with other objects. For example, in the exemplary embodiment illustrated in FIG. 6, containment layer 21A is position at a top point of the tube 10. In the case of a submerged sub-sea line position on the seabed, objects are more likely to strike the containment layer 21A rather than the tube 10.

FIGS. 7–9 illustrate alternative embodiments of a buoyancy control systems in which the buoyancy control system is integrally coupled to a tube 10. In the illustrated embodiments, the buoyancy control system comprises one or more buoyancy control layers, each formed of a buoyancy control material, that may be integrally attached to the tube 10 to form a coaxial layer of the tube 10. Each buoyancy control layer may be positioned at any location throughout the cross-section of the tube. A buoyancy control layer may be continuous and extend long the entire length of the tube 10. Alternatively, a buoyancy control layer may be one or more discrete lengths of buoyancy control material disposed at selected points along the length of the tube 10. The buoyancy control layer may be attached to the tube 10 during the manufacturing of the tube or in a post manufacturing process. The buoyancy control layer may be attached to the tube by chemical or mechanical bonding, by external straps or the like, or by any of the other attachment mechanisms described above.

In the exemplary embodiment illustrated in FIG. 7, an integral buoyancy control system 120 comprises the containment layer 21 and a buoyancy control material 30 positioned external to the composite layer 14 of the tube 10. The containment layer 14 forms the external layer of the tube 10 in the exemplary embodiment. The buoyancy control material 30 forms a buoyancy control layer for the tube 10 and is interposed between the containment layer 21 and the external layer of the tube, in this case the composite layer 14. The buoyancy control material, if a solid or in a hardened state, may be bonded or un-bonded to the underlying tube 10 and, thus, free to move axially relative to the tube 10. In the case of a fluid or non-hardened buoyancy control material, the buoyancy control material 30 may be pumped into the area defined by the boundaries of the containment layer 21 and the external layer of the tube 10.

In the exemplary embodiment illustrated in FIG. 8, the integral buoyancy control system 120 comprises a buoyancy control material 30 that is interposed between layers of the tube 10. In the case of the present embodiment, the buoyancy control material forms an integral buoyancy control layer that is interposed between the interior liner 12 and the composite layer 14 of the tube 10. In the present embodiment, a separate containment layer 21 is unnecessary, as the composite layer 14, or in other embodiments, or layers of the tube 10, may serve to contain a fluid or un-hardened buoyancy control material 30. In the case of a solid or hardened buoyancy control material 30, the buoyancy control material may be bonded or un-bonded to the interior liner 12 and/or the composite layer 14.

FIG. 9 illustrates an exemplary embodiment of an integral buoyancy control system 120 comprising a buoyancy control material 30 that forms a buoyancy control layer external to the composite layer 14 of the tube 10. In the exemplary illustrated embodiment, the buoyancy control material 30 is a solid material or in a hardened state, thus, a containment layer 21 may not be necessary. Such suitable solid or hardened buoyancy control materials 30 may include, but are not limited to, high density thermoplastics, thermosets, or thermoplastic elastomers, metals, minerals, ceramics, cement and concrete. Other suitable solid or hardened buoyancy control materials may include thermoplastics, thermosetts, and thermoplastic elastomers, which are filled or modified with organic, organic-inorganic or inorganic salts, minerals, ceramics, metal oxides or main group oxides, clays, sand, glass, cement, metals. Examples of these fillers include barite-loaded polypropylene, lead-filled nylon, iron oxide-loaded thermoplastics, glass fiber filled ABS, amongst others. The buoyancy control material 30 may be extruded onto the tube 10 or otherwise attached to the tube 10. As in the case of the exemplary embodiments described above, the buoyancy control material 30 need not be bonded to the underlying tube 10.

Energy conductors and sensors may be embedded into the layers, or between the layers, of the integral buoyancy control system described herein and the tube, in a manner analogous the external buoyancy control systems described above.

Many advantages may exist with integral buoyancy control systems. First, the buoyancy control material 30 and the containment layer 21, if present, may protect the underlying structural tube 10 from any external damage if the system is positioned external to the tube. Secondly, the buoyancy control material 30 may thermally insulate the underlying tube 10 so as to thermally protect the tube 10 from the surrounding ambient environment. Additionally, integral buoyancy control systems may be more spoolable than other external buoyancy control systems. And lastly, integral buoyancy control systems may exhibit improved deployment characteristics over non-integral embodiments. For example, tubes employing an integral buoyancy control systems may deploy more uniformly with less twisting than a tubes employing external buoyancy control systems. This may be due to the center of gravity of the tube employing an integral buoyancy control system may be along the longitudinal axis of the tube.

As discussed above, the buoyancy control material 30, in addition to having a desired buoyancy characteristic, may have select thermal properties and, thus, the buoyancy control material may also act as a thermal insulation layer. Suitable buoyancy control materials 30 that may provide thermal insulation properties may include high density thermoplastics, thermosets, or thermoplastic elastomers, metal, minerals, ceramics, cement, or concrete, in which the weighted material is foamed, contains air bubbles, glass microspheres, or secondary materials of low thermal conductivity, in order to improve the thermal insulating capabilities of the weighted material. Suitable thermal insulation layer buoyancy control materials 30 may also include thermoplastics, thermosets, or thermoplastic elastomers that are filled or modified with organic, organic-inorganic or inorganic salts, minerals, ceramics, metal oxides or main group oxides, clays, sand, glass, cement, metals. Other suitable thermal buoyancy control materials may include a wide variety of buoyancy control materials that include insulating materials such as gas bubbles, gas bubbles from chemical foaming or blowing agents; glass, ceramic, or inorganic beads, fibers or microspheres. Some examples of these suitable thermal buoyancy control materials 30 include barite-loaded, bicarbonate foamed polypropylene; glass-microsphere in a barite loaded polypropylene.

The buoyancy control systems described herein may be used with tubing in any environment to control the buoyancy of the tubing. As described in the exemplary methods of buoyancy control discussed in detail below, buoyancy control material may be provided to the buoyancy control system before, during, and/or after installation of the buoyancy control system, depending at least partially on the buoyancy control material selected. Buoyancy control materials delivered in a flowable state, for example fluid buoyancy control materials or un-hardened buoyancy control materials, provide flexibility to the installation process as a flowable buoyancy control material may be introduced at any time, and may be adjusted along the length of the buoyancy control system to permit dynamic buoyancy control. In the case of hardened or solid buoyancy control materials, a continuous spoolable buoyancy control system may be employed to facilitate transport and installation. For example, a continuous spoolable buoyancy control system may be unspooled in conjunction with the unspooling of continuous spoolable tube. The buoyancy control systems may also be attached to or otherwise coupled to the tube before, during, or after installation of the buoyancy control system, as described above.

Figure 10:
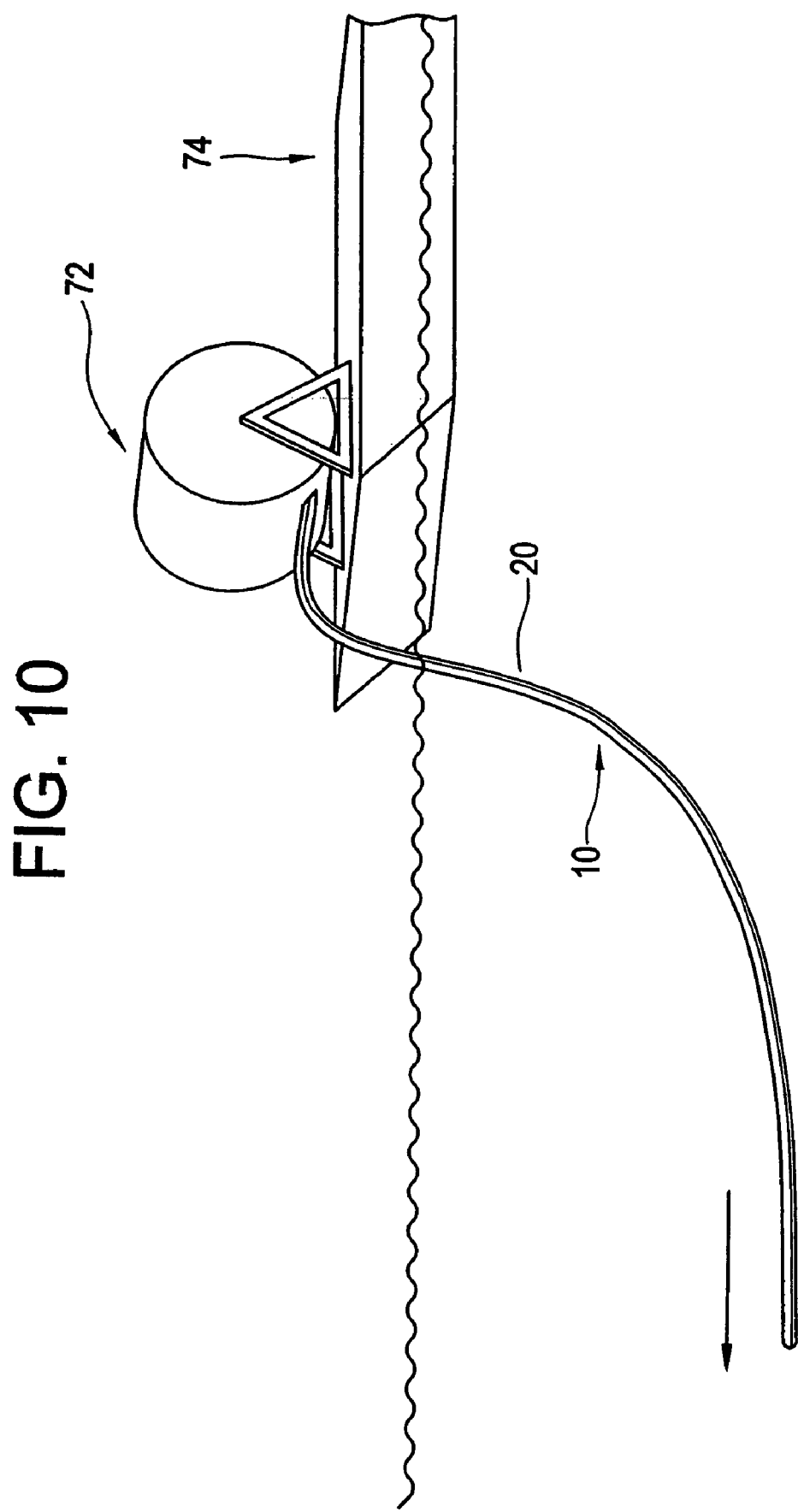
FIG. 10 illustrates an exemplary method of installing a tube with a buoyancy control system.

FIG. 10 illustrates an exemplary method for installing the spoolable continuous buoyancy control system 20 illustrated in FIGS. 1 and 2 in a sub sea environment. In the illustrated exemplary embodiment, the tube 10 is a low density, inherently positively buoyant spoolable tube and the buoyancy control material 30 is negatively buoyant. The tube 10 and the buoyancy control system 20 are spooled on a reel 72 mounted on a barge 74 or other transport. The buoyancy control material may be pumped into the containment layer 21, in the case of a flowable buoyancy control material, or otherwise attached to the containment layer 21, prior to, during, or after installation. The containment layer 21, in the present embodiment, is spoolable and may be attached to the tube prior to, during, or after installation. The buoyancy of the tube 10 is adjusted or controlled to a negatively buoyancy by attaching the buoyancy control system 20 to the tube. The tube and the buoyancy control system will thus sink, preferably to the seabed, as the tube and the buoyancy control system 20 are unspooled into the water. In the case of a previously installed pipeline, the buoyancy control system may be attached to the tube forming the pipeline after installation of the buoyancy control system.

Figure 11:
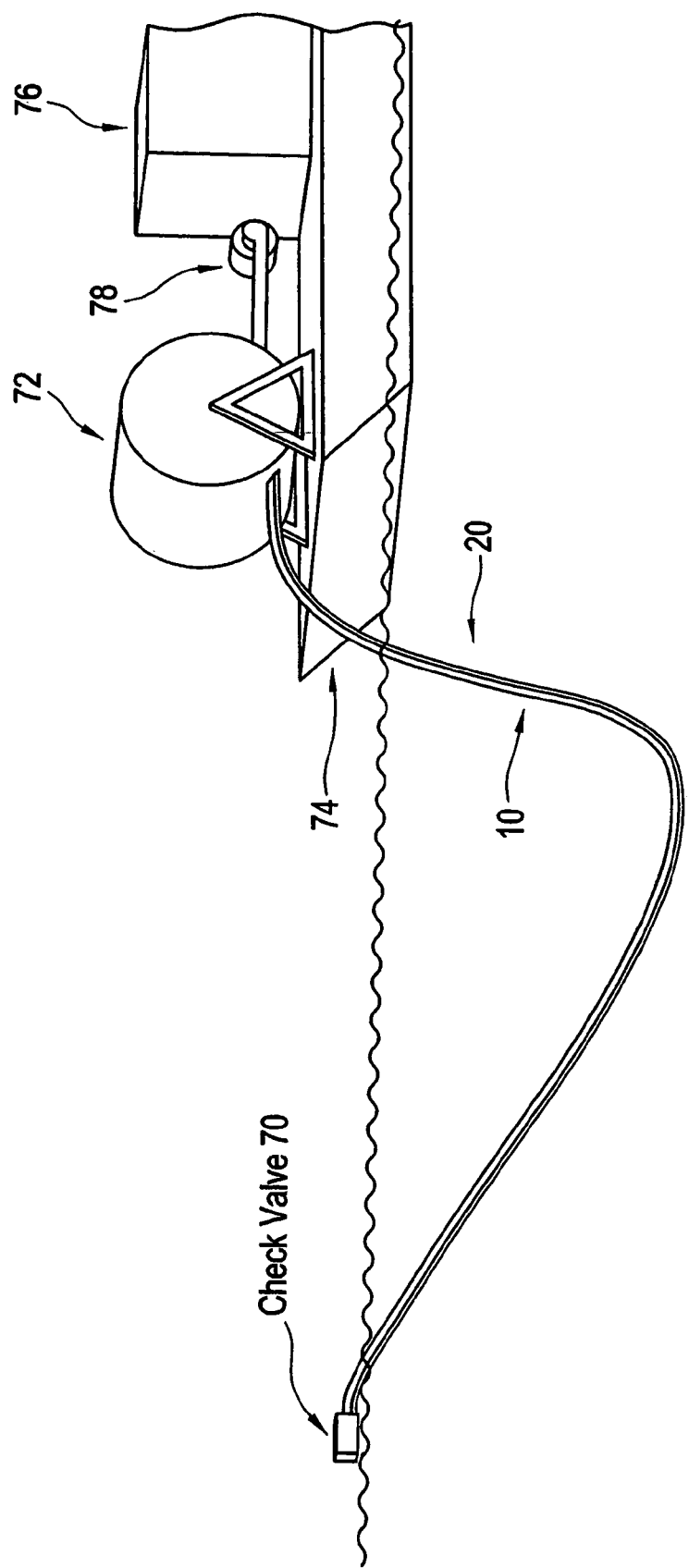
FIG. 11 illustrates another exemplary method of installing a tube with a buoyancy control system.

FIG. 11 illustrates an alternative method for installing a spoolable continuous buoyancy control system in a sub sea environment. In this embodiment, a negatively buoyant, flowable buoyancy control material 30 may be pumped or otherwise delivered into an inherently positively buoyant containment layer 21 after installation. The buoyancy control system 20 may be in fluid connection with a source 76 of buoyancy control material 30. A pump 78 or other means for displacing the buoyancy control material may be provided to pump the material from the source 76 into the buoyancy control system 20. Initially, the positively buoyant containment layer 21 will float when unspooled into the water. Once the continuous buoyancy control system 20 is in the desired location, the negatively buoyant, flowable buoyancy control material 30 may be pumped into the containment layer 21. The buoyancy control system 20 will become negatively buoyant as the buoyancy control material 30 is pumped into place and will sink, preferably to the sea bed. A check valve 70 may be placed at the end of the containment layer 21 to allow for air, or other material that may reside in the unfilled containment layer 21, to escape as the containment layer 21 is filled with the buoyancy control material 30. The check valve 70 may then be closed when the containment layer 21 is filled with the desired volume of buoyancy control material 30. Optionally, the check valve 70 may also operate to discharge the buoyancy control material 30 when dynamic buoyancy control of the continuous buoyancy control system 20 is desired, for example, when the buoyancy control system 20 is used in dynamic installations.

In alternative embodiments, the containment layer 21 may be filled during installation with a first liquid buoyancy control material having a first buoyancy characteristic that may be advantageous in facilitating the one or more stages of installation of the buoyancy control system. At a later point, a second liquid buoyancy control material, having a second buoyancy characteristic, different than the first buoyancy characteristic, may be added to the containment layer to further control the buoyancy of the tube. For example, in one exemplary embodiment, a first buoyancy control material having a buoyancy characteristic selected to render the tube neutrally buoyant may be employed. At a later point during installation, a second buoyancy control material having a buoyancy characteristic selected to render the tube negatively buoyant may be employed to cause the tube and the buoyancy control system to sink.

Figure 12:
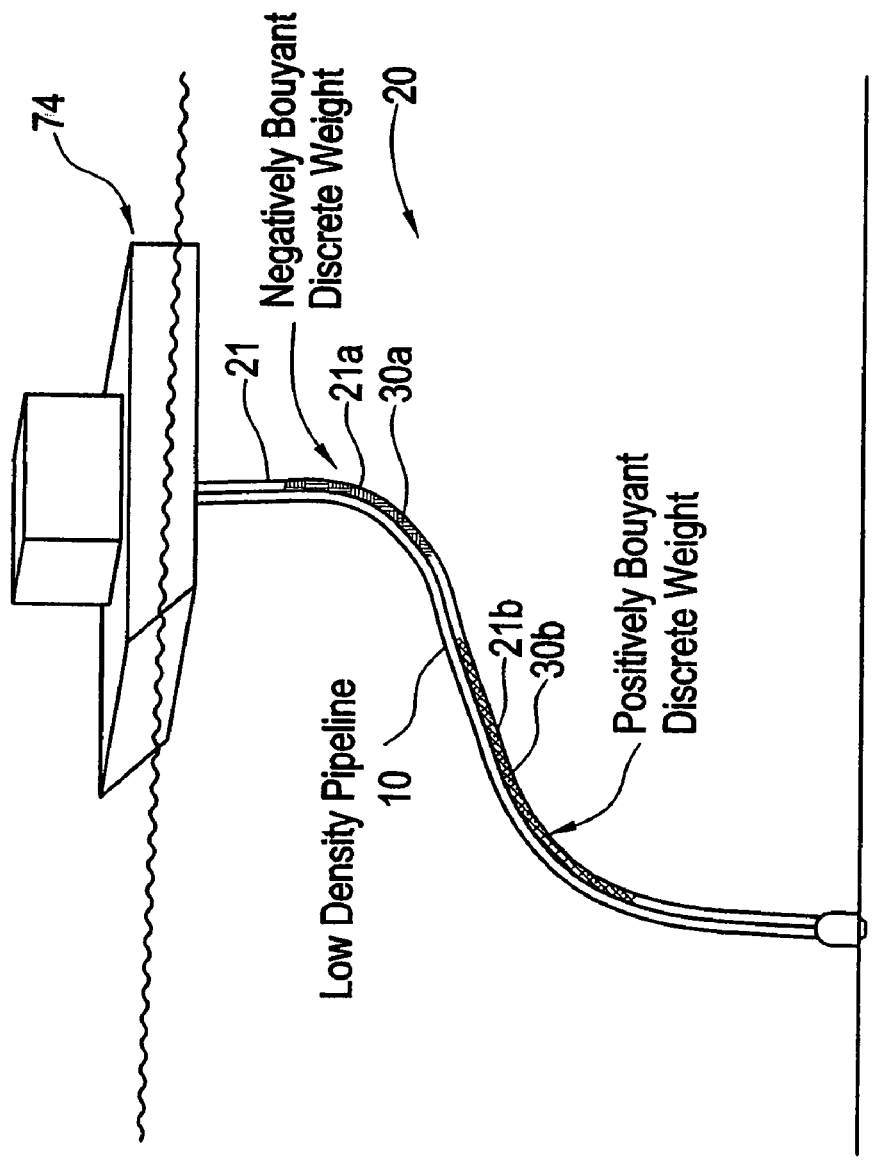
FIG. 12 is an exemplary embodiment of a buoyancy control system comprising a variable buoyancy system for use in a dynamic installation environment.

FIG. 12 illustrates an exemplary method of dynamically controlling the buoyancy of an inherently positively buoyant tube along the longitudinal axis of the tube in a dynamic sub sea environment. In the exemplary embodiment, the tube 10 is deployed vertically from the water surface to the seabed, as in the case of a sub sea oil well. For example, the tube 10 may be a riser, flow line, control line, or umbilical line that is connected at one end to an oil well head at the seabed. The buoyancy profile along the longitudinal axis of the tube 10 may be controlled, as the environmental conditions dictate, by pumping or otherwise displacing a buoyancy control material 30 along the length of the containment layer 21 of the buoyancy control system 20. The response characteristics of the buoyancy control system 20 may be controlled in real time or near-real time by actively controlling the buoyancy profile of the buoyancy control system 20, in response to the dynamically-changing environmental conditions.

In certain embodiments, multiple buoyancy control materials may be employed within the buoyancy control system. The buoyancy profile of the tube 10 may thus be controlled by actively pumping a plurality of different buoyancy control materials 30, each having different buoyancy characteristics, within the containment layer 21. In the exemplary embodiment illustrated in FIG. 12, select longitudinal sections of the containment layer 21 may contain different buoyancy control materials 30 having different buoyancy characteristics, by for example, employing buoyancy control materials having differing densities. For example, longitudinal section 21a of the containment layer 21 may contain a negatively buoyancy control material 30a that renders a discrete, localized section of the tube 10 negatively buoyant. Additionally, longitudinal section 21b of the containment layer 21 may contain a positively buoyant buoyancy control material 30b that renders a discrete, longitudinal section of the tube 10 positively buoyant. By actively using pumps or other mechanisms to longitudinally displace the buoyancy control materials 30a and 30b within the buoyancy control system, the buoyancy profile of the tube may be actively controlled in response to the dynamic environmental conditions.

One skilled in the art will appreciate that, in addition to utilizing a flowable buoyancy control material 30 or a plurality of flowable buoyancy control materials 30, the longitudinal buoyancy profile of the tube may be tailored by employing a layer of the buoyancy control system that has a variable buoyancy characteristic along the longitudinal axis of the buoyancy control system. The buoyancy characteristics of the buoyancy control system may vary along the length of the buoyancy control system, by, for example, providing one or more buoyancy control materials of differing densities along the length of the buoyancy control system, by varying the amount, e.g., the thickness, of buoyancy control material provided along the length of the buoyancy control system, or by a combination of both.

Figure 13:
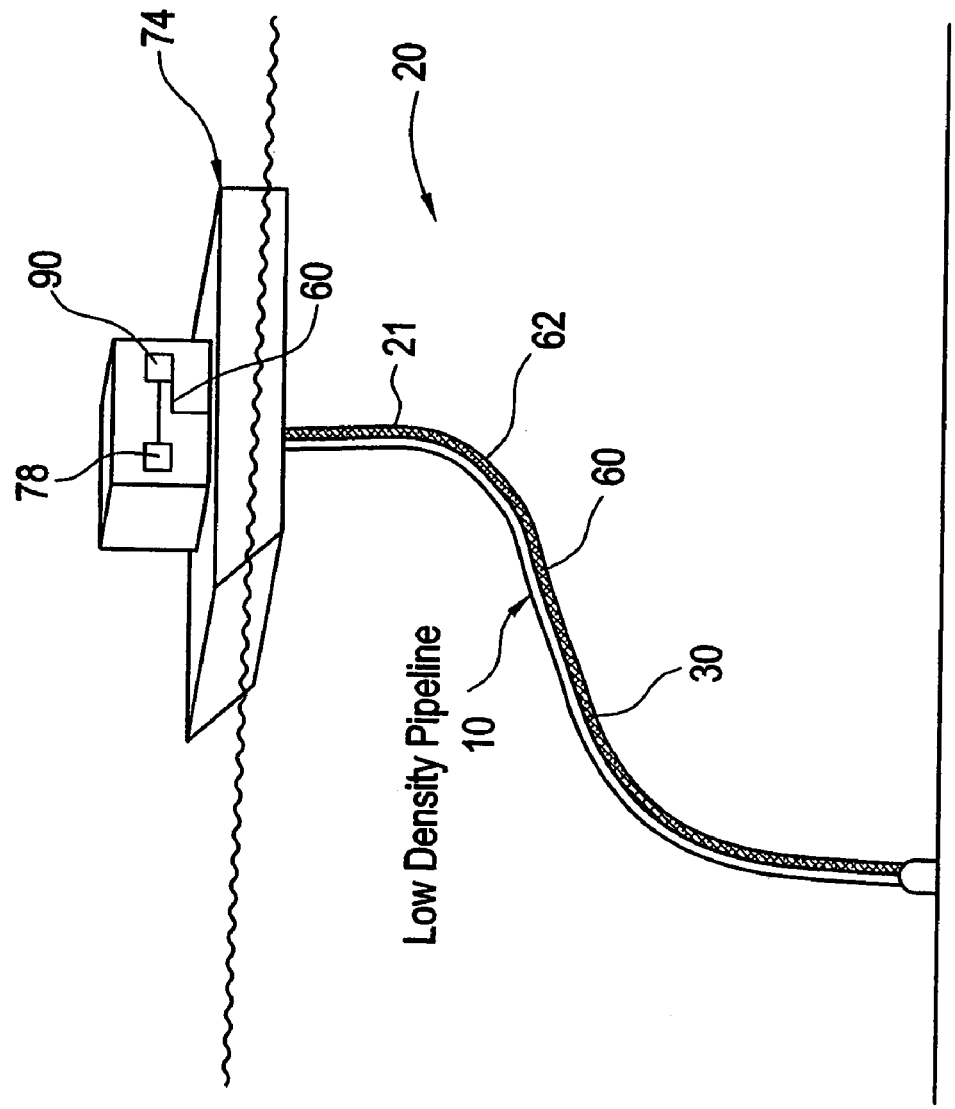
FIG. 13 is an exemplary embodiment of a buoyancy control system comprising a controllable variable buoyancy system having sensors for use in a dynamic installation environment.

FIG. 13 illustrates another exemplary method of dynamically controlling the buoyancy of an inherently positively buoyant tube along the longitudinal axis of the tube in a dynamic sub sea environment. In the illustrated embodiment, the continuous buoyancy control system 20 has a controllable buoyancy profile, as discussed above, and utilizes sensors 62 to monitor environmental conditions and tube conditions in real time or near-real time. The sensors 62 may be embedded or coupled to any portion of the buoyancy control system, including the containment layer 21, if present, the buoyancy control material 30, or the outer jacket 50, if present. The sensors 62 also may be embedded or coupled to any layer of the tube. The sensors 62 may provide data along one or more energy conductors 60 to a processor 90 or the like of the buoyancy control system 20 that may operate to adjust the buoyancy profile of the buoyancy control system 20 in response to the data received from the sensors 60. The processor 70 may be in signal communication with one or more pumps 70 that can operate to displace the buoyancy control material(s) 30 within the buoyancy control system 20. As changing conditions are detected by the sensors 62 and communicated to the processor 70, the processor 70 can instruct the pump or pumps to adjust the longitudinal position of the buoyancy control material within the buoyancy control system to thereby adjust the longitudinal buoyancy profile of the system.

While the buoyancy control systems and methods disclosed herein have been particularly shown and described with references to exemplary embodiments thereof, it will be understood by those skilled in the art that various changes in form and details may be made therein without departing from the spirit and scope of this disclosure. Those skilled in the art will recognize or be able to ascertain using no more than routine experimentation, many equivalents to the exemplary embodiments described specifically herein. Such equivalents are intended to be encompassed in the scope of the present disclosure.

The invention claimed is:

1. A method, comprising:
   providing a generally tubular length of buoyancy control material, where the material comprises a negatively buoyant slurry,
   attaching the length of buoyancy control material to a section of the length of a tube to adjust the buoyancy of the section of the tube; and
   using at least one of a curing agent, a hardener, and a gellation agent to cause the buoyancy control material to set.

2. The method of claim 1, where providing a generally tubular length includes providing a length of buoyancy control material that is an integral, coaxial layer of the tube.

3. The method of claim 1, where attaching includes externally attaching the length of buoyancy control material to the tube.

4. The method of claim 3, where the length of the buoyancy control material has a longitudinal axis that is spaced-apart from a longitudinal axis of the tube.

5. The method of claim 1, where providing a generally tubular length of buoyancy control material includes providing a buoyancy control material having a specific gravity greater than or equal to 1.25.

6. The method of claim 5, where the buoyancy control material has a specific gravity greater than or equal to 2.0.

7. The method of claim 1, where the buoyancy control material is displaceable along the section of the tube.

8. The method of claim 1, further comprising:
positioning a containment layer about the buoyancy control material.

9. The method of claim 8, where the containment layer is generally tubular in shape.

10. The method of claim 8, where the containment layer is collapsible and expandable.

11. The method of claim 8, where the containment layer has a diameter approximate to a diameter of the tube.

12. The method of claim 8, further comprising:
spooling the containment layer and the buoyancy control material on a reel.

13. The method of claim 8, further comprising:
encapsulating the tube and the containment layer with an outer jacket.

14. The method of claim 13, further comprising:
coupling at least one energy conductor to the outer jacket.

15. The method of claim 14, further comprising:
embedding the energy conductor within the outer jacket.

16. The method of claim 13, further comprising:
positioning one or more sensors along the length of the tube.

17. The method of claim 16, where positioning include coupling the sensors to the outer jacket.

18. The method of claim 8, where the containment layer is continuously bonded to the section of the tube.

19. The method of claim 8, where the containment layer is discretely attached to the section of the tube.

20. The method of claim 1, where the slurry includes one or more of: drilling mud, sand-loaded water, and barite-loaded water.

* * * * *

UNITED STATES PATENT AND TRADEMARK OFFICE
CERTIFICATE OF CORRECTION

| | | |
|---|---|---|
| PATENT NO. | : 7,029,356 B2 | Page 1 of 1 |
| APPLICATION NO. | : 10/894921 | |
| DATED | : April 18, 2006 | |
| INVENTOR(S) | : Peter A. Quigley et al. | |

It is certified that error appears in the above-identified patent and that said Letters Patent is hereby corrected as shown below:

On the title page item (54), and col. 1, line 1, replace the word "Systems" with --Method--.

In the claims, at claim 1, line 1, please replace the words "A method, comprising" with --A method for controlling the buoyancy of a tube, comprising.--

Signed and Sealed this

Eleventh Day of September, 2007

JON W. DUDAS
*Director of the United States Patent and Trademark Office*